(No Model.)

A. BOYLES.
FEED TROUGH.

No. 351,489. Patented Oct. 26, 1886.

Witnesses
R. C. Laurie
Sarepta Specht

Inventor
Andrew Boyles
By R. S. & A. P. Lacey, Att'ys

\# UNITED STATES PATENT OFFICE.

ANDREW BOYLES, OF CONCORDIA, KANSAS.

FEED-TROUGH.

SPECIFICATION forming part of Letters Patent No. 351,489, dated October 26, 1886.

Application filed August 5, 1886. Serial No. 210,123. (No model.)

*To all whom it may concern:*

Be it known that I, ANDREW BOYLES, a citizen of the United States, residing at Concordia, in the county of Cloud and State of Kansas, have invented certain new and useful Improvements in Feed-Troughs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to troughs for feeding stock—such as sheep, hogs, &c.

It has for its object to combine with a trough a self-feeding hopper located at a higher level, and designed to supply feed proportionate as that in the trough is devoured, thereby preventing the wasting of feed so common where it is all placed in the trough at one time. A further object is to divide the trough longitudinally, forming two troughs, and locate the feed-spouts so that each will supply the two troughs. A still further object is to separate the trough into a number of smaller troughs by transverse bars which extend beyond the sides of the trough in each direction, forming stalls which prevent the crowding of the animals.

The improvements consist in the novel features more fully hereinafter set forth and claimed, and shown in the annexed drawings, in which—

Figure 1:
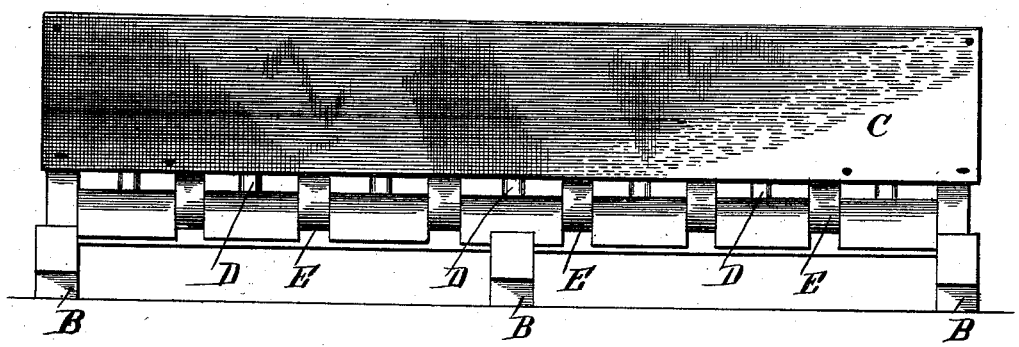
Figure 2:
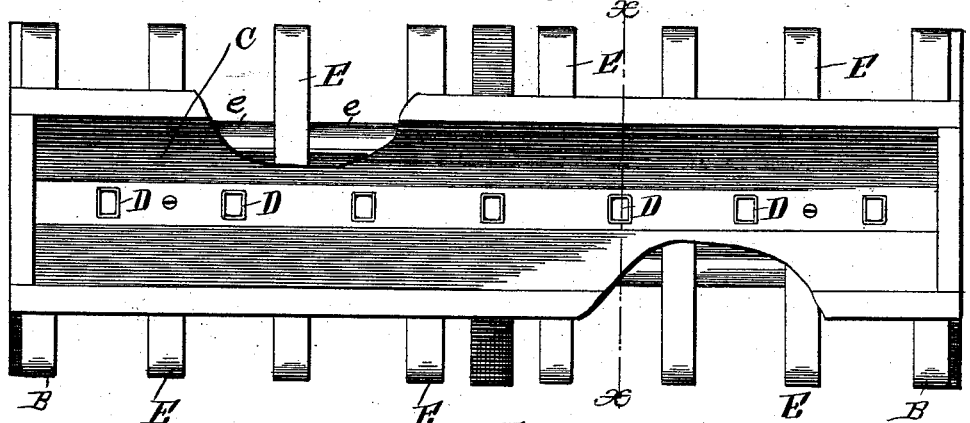
Figure 3:
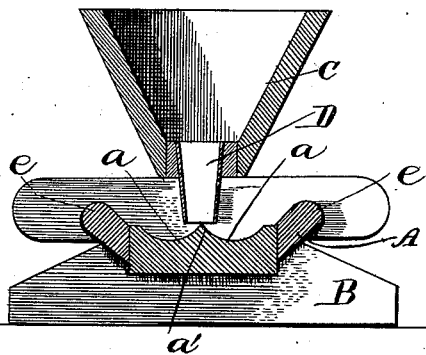

Figure 1 is a side view. Fig. 2 is a plan view, parts broken away. Fig. 3 is a section on the line X X of Fig. 2.

The trough comprises a board, A, longitudinally channeled on each side of a median line and supported on foot pieces or blocks B. The channels $a$, which form the receptacle for the feed, may be of any desired depth. They are separated by a ridge or crest, $a'$. Above the trough is supported a hopper, C, having sloping sides, and the bottom is provided at intervals with openings, from which tubes D extend and rest upon the crest $a'$ in such manner that the feed is divided at the point of exit and flows to each side, thus supplying both troughs. The long trough is divided into a number of smaller troughs by cross-bars E, which are located between each two of the tubes. The ends project beyond the sides of the trough, forming stalls, which keep the animals separated and prevent their crowding. The cross-bars fill the space between the bottom of the hopper and the trough, and have their lower edges conformed to the slope of the channels. In this capacity the cross-bars serve as supports for the hopper and partitions for the trough.

Blocks $e$, filled in between the cross-bars and rounded on their upper edges, increase the width of the trough and steady the cross-bars.

Having thus described my invention, what I claim, and desire to secure by Letters Patent, is—

The herein shown and described feed-trough, consisting of the following elements: the foot-pieces, the board longitudinally channeled, forming troughs and a median ridge, supported thereon, the cross-bars secured upon the board and dividing the troughs into independent compartments and extended outward on opposite sides, forming stalls, the hopper secured on the tops of the cross-bars, the discharge-spouts arranged between the cross-bars depending from the bottom of the hopper, and having their lower ends terminating directly above the ridge and extended about equidistant on opposite sides thereof, and the filling-blocks secured to the edges of the trough-board and located between the cross-bars, whereby the troughs are widened and the cross-bars steadied and prevented from lateral displacement.

In testimony whereof I affix my signature in presence of two witnesses.

ANDREW BOYLES.

Witnesses:
W. M. BECK,
D. B. HARRISON.